US006872501B2

(12) United States Patent
Majumdar et al.

(10) Patent No.: US 6,872,501 B2
(45) Date of Patent: Mar. 29, 2005

(54) ANTISTAT OF ONIUM SALT AND POLYETHER POLYMER

(75) Inventors: Debasis Majumdar, Rochester, NY (US); Thomas M. Laney, Spencerport, NY (US); Jehuda Greener, Rochester, NY (US); Peter T. Aylward, Hilton, NY (US); Dinesh Tyagi, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 228 days.

(21) Appl. No.: 10/133,836

(22) Filed: Apr. 26, 2002

(65) Prior Publication Data

US 2003/0073577 A1 Apr. 17, 2003

Related U.S. Application Data

(63) Continuation-in-part of application No. 09/853,905, filed on May 11, 2001, now abandoned.

(51) Int. Cl.$^7$ .............................. G03C 1/85; G03C 1/89; G03C 8/52; B32B 27/32; B41M 5/24
(52) U.S. Cl. .................. 430/201; 430/527; 430/528; 347/105; 428/32.22; 428/32.39; 428/32.63; 428/411.1; 428/523; 503/227
(58) Field of Search ................................. 430/527, 528, 430/201; 503/227; 347/105; 428/523, 411.1, 32.22, 32.39, 32.63

(56) References Cited

U.S. PATENT DOCUMENTS

| | | | | |
|---|---|---|---|---|
| 3,630,740 | A | * | 12/1971 | Joseph et al. |
| 3,850,641 | A | * | 11/1974 | Horigame et al. |
| 3,951,662 | A | * | 4/1976 | Chiba et al. |
| 4,013,696 | A | * | 3/1977 | Babbitt et al. |
| 5,187,214 | A | * | 2/1993 | Govindan |
| 5,652,326 | A | * | 7/1997 | Ueda et al. |
| 5,863,466 | A | * | 1/1999 | Mor |
| 5,902,720 | A | * | 5/1999 | Haydock et al. |
| 6,027,847 | A | * | 2/2000 | Wilson et al. |
| 6,048,606 | A | | 4/2000 | Bourdelais et al. |
| 6,071,680 | A | | 6/2000 | Bourdelais et al. |
| 6,074,788 | A | | 6/2000 | Bourdelais et al. |
| 6,074,793 | A | | 6/2000 | Camp et al. |
| 6,080,532 | A | | 6/2000 | Camp et al. |
| 6,083,669 | A | | 7/2000 | Bourdelais et al. |
| 6,093,521 | A | | 7/2000 | Laney et al. |
| 6,197,486 | B1 | * | 3/2001 | Majumdar et al. |
| 6,207,361 | B1 | * | 3/2001 | Greener et al. |

\* cited by examiner

Primary Examiner—Richard L. Schilling
(74) Attorney, Agent, or Firm—Lynne M. Blank

(57) ABSTRACT

The invention relates to a material comprising a sheet wherein said sheet comprises at least one layer comprising polyether polymeric antistat and thermally processable onium salt.

74 Claims, No Drawings

ANTISTAT OF ONIUM SALT AND POLYETHER POLYMER

CROSS REFERENCE TO RELATED APPLICATIONS

This application is a continuation-in-part application of U.S. Ser. No. 09/853,905, filed May 11, 2001 ABN.

FIELD OF THE INVENTION

This invention relates to a conductive sheet. In a preferred form it relates to imaging elements, particularly laminated base materials for imaging elements.

BACKGROUND OF THE INVENTION

The problem of controlling static charge during plastic web manufacturing and transport is well known. Generation and uncontrolled discharge of electrostatic charge can cause a number of serious problems including safety hazards. In the field of imaging, particularly photography, the accumulation of charge on film or paper surfaces leads to the attraction of dirt, which can produce physical defects. The discharge of accumulated charge during or after the application of the sensitized emulsion layer(s) can produce irregular fog patterns or "static marks" in the emulsion. The static problems have been aggravated by increase in the sensitivity of new emulsions, increase in coating machine speeds, and increase in post-coating drying efficiency. The charge generated during the coating process may accumulate during winding and unwinding operations, during transport through the coating machines and during finishing operations such as slitting and spooling.

It is generally known that electrostatic charge can be dissipated effectively by incorporating one or more electrically-conductive "antistatic" layers into the support structure. Typical location of an antistatic layer is an external surface, which comes in contact with various transport rollers. For imaging elements, the antistatic layer is usually placed on the side of the support opposite to the imaging layer.

A wide variety of electrically-conductive materials can be incorporated into antistatic layers to produce a wide range of conductivities. These can be divided into two broad groups: (i) ionic conductors and (ii) electronic conductors. In ionic conductors charge is transferred by the bulk diffusion of charged species through an electrolyte. Here the resistivity of the antistatic layer is dependent on temperature and humidity. Antistatic layers containing simple inorganic salts, alkali metal salts of surfactants, ionic conductive polymers, polymeric electrolytes containing alkali metal salts, and colloidal metal oxide sols (stabilized by metal salts), described previously in patent literature, fall in this category. However, many of the inorganic salts, polymeric electrolytes, and low molecular weight surfactants used are water-soluble and are leached out of the antistatic layers during processing, resulting in a loss of antistatic function. The conductivity of antistatic layers employing an electronic conductor depends on electronic mobility rather than ionic mobility and is independent of humidity. Antistatic layers which contain conjugated polymers, semiconductive metal halide salts, semiconductive metal oxide particles, etc., have been described previously. However, these antistatic layers typically contain a high volume percentage of electronically conducting materials, which are often expensive and impart unfavorable physical characteristics, such as color, increased brittleness and poor adhesion, to the antistatic layer.

A vast majority of the prior art involves coatings of antistatic layers from aqueous or organic solvent based coating compositions. For photographic paper, typically antistatic layers based on ionic conductors, are coated out of aqueous and/or organic solvent based formulations, which necessitate an effective elimination of the solvent. Under fast drying conditions, as dictated by efficiency, formation of such layers may pose some problems. An improper drying will invariably cause coating defects and inadequate adhesion and/or cohesion of the antistatic layer, generating waste or inferior performance. Poor adhesion or cohesion of the antistatic layer can lead to unacceptable dusting and track-off. A discontinuous antistatic layer, resulting from dusting, flaking, or other causes, may exhibit poor conductivity, and may not provide necessary static protection. It can also allow leaching of calcium stearate from the paper support into the processing tanks causing build-up of stearate sludge. Flakes of the antistatic backing in the processing solution can form soft tar-like species, which, even in extremely small amounts, can re-deposit as smudges on drier rollers eventually transferring to image areas of the photographic paper, creating unacceptable defect.

Moreover, majority of antistats on current photographic paper products lose their electrical conductivity after photographic processing due to their ionic nature. This can cause print sticking after drying in the photoprocessor, and/or in a stack.

Besides antistatic properties, an auxiliary layer in a photographic element maybe required to fulfill additional criteria depending on the application. For example for resin-coated photographic paper, the antistatic layer if present as an external backing layer should be able to receive prints (e.g., bar codes or other indicia containing useful information) typically administered by dot matrix printers and to retain these prints or markings as the paper undergoes processing. A vast amount of photographic paper in the market uses colloidal silica based antistatic backings, which without a suitable polymeric binder provide poor post-processing backmark retention qualities.

In U.S. Pat. Nos. 6,197,486 and 6,207,361, antistatic layers have been disclosed which can be formed through the (co)-extrusion method thus eliminating the need to coat the support in a separate step and rendering the manufacturing process less costly.

However, there is still a need for electrical conductivity in the antistatic layer than is superior to that currently available. For most paper based imaging products a backside surface electrical resistivity or SER of 13 log ohms/square is considered sufficient for most practical purpose. This is because the paper base itself is ionically conductive, due to the presence of salt and base moisture in these supports, and minimizes the conductivity requirement for the back surface. However, as the next generation of "all plastic" imaging display products are designed utilizing voided polymeric materials, eliminating paper cores such as in U.S. Pat. Nos. 6,093,521; 6,083,669; 6,080,532; 6,074,793; 6,074,788; 6,071,680; and 6,048,606, the conductivity derived from paper cores is lost. Because of their "all plastic" nature, these new products are highly insulating and require higher level of static protection. For such products, backside SER significantly lower than 13 log ohms/square may be necessary for their manufacturing and end use.

PROBLEM TO BE SOLVED BY THE INVENTION

There remains a need for materials with superior electrical conductivity that can be incorporated into sheets for antistatic protection, which are formed through thermal processing and do not require solvent based coatings of antistatic layers.

SUMMARY OF THE INVENTION

It is an object of the invention to provide materials, which are of superior electrical conductivity to be useful in static dissipation.

It is another object to provide aforesaid materials through melt processing without requiring solvent based coatings.

It is a further object to provide improved imaging elements with an antistatic surface, which can be efficiently conveyed during manufacturing, sensitizing, finishing and processing, and can be easily printed on.

These and other objects of the invention are accomplished by a material comprising a sheet wherein said sheet comprises at least one layer comprising polyether polymeric antistat and thermally processable onium salt.

ADVANTAGEOUS EFFECT OF THE INVENTION

The invention provides improved web based materials, which are of superior antistatic characteristic. The invention also provides improved imaging elements with an antistatic surface, which can be efficiently conveyed during manufacturing, sensitizing, finishing and processing, and can be easily printed on.

The invention further provides antistatic characteristics even after wet chemical processing. Moreover, the web of the invention can be formed through melt processing operations, such as extrusion and co-extrusion, without requiring solvent based coating.

DETAILED DESCRIPTION OF THE INVENTION

There are numerous advantages of the invention over prior practices in the art. The invention provides improved web based materials, which are antistatic. When implemented in an imaging element, particularly photographic products, the invention provides antistatic characteristics before and after photographic processing. The surprising characteristic of post-processing conductivity in the web of the invention can minimize print sticking, dirt attraction, and other problems commonly encountered in photographic products. The improved conductivity of the web of the invention makes it particularly suitable for "all plastic" supports, such as those proposed for new generation of display type imaging elements. These supports are more insulating in nature than traditional paper based photographic supports and require more efficient static control, which can be accomplished through this invention.

The melt processability of the material of the invention allows for advantageous incorporation of antistatic layer(s), as integral part of the web during manufacturing. The web of the invention having integral antistatic layers do not require a separate step for coating antistatic materials which would require removal of solvents and thereby increase manufacturing costs. As the imaging material of the invention is not aftercoated with the antistatic material, there is no need for the drying step required in the prior art processes. There is a cost advantage as there is one less coating and drying step required in image member formation.

A further advantage of the invention is the ability of the web to receive prints and retain them after wet chemical processing. In display products, such as photographic paper, backprinting of various barcodes and indicia is carried out by photofinishers before wet processing, to record a variety of information. This is typically accomplished using dot matrix or inkjet printers. It is expected that such backprints will be clearly legible after processing. Many colloidal silica based backings of prior art on photographic paper fail to achieve this feature adequately. The web of the invention, when incorporated in an imaging element, desirably fulfills this expectation.

In a preferred embodiment, the invention can provide the web surface with the roughness characteristics desirable for easy conveyance. When incorporated on the backside of photographic products, the invention can allow for efficient transport through photoprocessing equipment. Photographic papers with a smooth back surface can experience transport difficulties and jamming in machines required for developing, transporting and packaging of photographic paper.

Controlled roughness in the web of the invention can also provide writability, as explained in details in co-pending application docket 81794. The consumers desire for writing useful information on the backside of images using conventional writing instrument such as pens and pencils can be accommodated through this invention by careful control of the surface roughness.

Another advantage of the invention is realized during the end-use by the customer. Images in the final customer format are commonly stored on top of each other. In this format, the backside of the photographic image is placed in contact with the emulsion side, and there is a tendency for the images to stick together. Sticking can be aggravated both under dry conditions, due to generation of static charge, and under hot and humid conditions, due to the tackiness of the image layer. Such sticking makes subsequent handling of the stacked images difficult, as the consumer must separate the images. The invention in one preferred form can minimize the tendency of image sticking through its control of backside roughness and improved antistatic characteristics. These and other advantages will be apparent from the detailed description below.

The terms as used herein, "top", "upper", "emulsion side", and "face" mean the side or toward the side of a photographic member bearing the imaging layers. The terms "bottom", "lower side", and "back" mean the side or toward the side of the photographic member opposite from the side bearing the photosensitive imaging layers or developed image. The term "void" as used in "voided polymer" is used herein to mean porous or devoid of added solid or liquid matter, although it is likely the "voids" contain gas. The term "voided polymers" will include materials comprising polymeric foam, microvoided polymers and microporous materials known in the art.

The material of the invention comprises a sheet wherein said sheet comprises at least one layer comprising polyether polymeric antistat as component A and thermally processable onium salt as component B.

Polyether based polymeric antistats (component A) are essentially materials containing polyalkoxylated compounds, which are well known in the art for their excellent melt-processabilty while retaining their antistatic property and overall physical performance. These materials can include various polymeric substances containing polyether blocks such as polyethylene oxides, polypropylene oxides, polybutylene oxides, polytetramethylene oxides, polyoxyalkylene glycols such as polyoxyethylene glycol, polyoxypropylene glycol, polyoxytetramethylene glycol, the reaction products of polyalkoxylates with fatty acids, the reaction products of polyalkoxylates with fatty alcohols, the reaction products of polyalkoxylates with fatty acid esters of polyhydroxyl alcohols (for instance polyalkoxylate reaction products of fatty acids, of fatty glycols, of fatty sorbitols, of fatty sorbitans, and of fatty alcohols), or, interpolymers and/or mixtures thereof. The polyether chains in the suitable polyalkoxylated compounds are of the formula $(-OC_xH_{2x}-)_n$ wherein x is from 2 to about 8, wherein the alkyl group is straight or branched, and wherein n is from 2 to about 1000. It is believed that ionic conduction along the polyether chains makes these polymers inherently dissipative, yielding surface resistivities in the range $10^8-10^{13}$ ohm/square. For the purpose of this invention any polyalkoxylated compounds containing oligomer, homopolymer, interpolymer and/or mixtures thereof can suitably be used as component A in this invention. However, preferred examples of such polyether polymeric antistatic materials are: those comprising polyamide blocks and polyether block(s), e.g., as disclosed in U.S. Pat. Nos. 4,331,786, 4,115,475, 4,195,015, 4,839,441, 4,864,014, 4,230,838 and 4,332,920 and product literature for Pebax supplied by Elf Atochem, polyetheresteramides, e.g., as disclosed in U.S. Pat. Nos. 5,604,284; 5,652,326; 5,886,098, and thermoplastic polyurethanes containing a polyalkylene glycol moiety, e.g., as disclosed in U.S. Pat. Nos. 5,159,053; 5,863,466, with the content of all of the aforementioned literature incorporated herein by reference. Most preferred polyether polymeric antistats are those comprising polyamide blocks and polyether block(s).

Polymers comprising polyamide blocks and polyether block(s) result from the copolycondensation of polyamide sequences containing reactive ends with polyether sequences containing reactive ends, such as, inter alia: 1) Polyamide sequences containing diamine chain ends with polyoxylakylene sequences containing dicarboxyl chain ends, 2) Polyamide sequences containing dicarboxyl chain ends with polyoxyalkylene sequences containing diamine chain ends obtained by cyanoethylation and hydrogenation of alpha.,.omega.-dihydroxylated aliphatic polyoxylakylene sequences known as polyetherdiols, 3) Polyamide sequences containing dicarboxyl chain ends with polyetherdiols, the products obtained being, in this specific case, polyetheresteramides.

The polyamide sequences containing dicarboxyl chain ends result, for example, from the condensation of .alpha., .omega.-aminocarboxylic acids from lactams or of dicarboxylic acids and diamines in the presence of a chain-limiting dicarboxylic acid. The polyamide blocks are advantageously formed from polyamide-6/12.

The number-average molecular mass or weight Mn of the polyamide sequences is between 300 and 15,000 and preferably between 600 and 5,000. The Mn of the polyether sequences is between 100 and 6,000 and preferably between 200 and 3,000.

The polymers containing polyamide blocks and polyether blocks can also comprise units distributed randomly. These polymers can be prepared by the simultaneous reaction of the polyether and the precursors of the polyamide blocks.

For example, polyetherdiol, a lactam (or an .alpha., .omega.-amino acid) and a chain-limiting diacid can be reacted in the presence of a small amount of water. A polymer is obtained having essentially polyether blocks and polyamide blocks of highly variable length but also the various reactants, which have reacted randomly, distributed statistically along the polymer chain.

These polymers contain polyamide blocks and polyether blocks, whether they originate from the copolycondensation of polyamide and polyether sequences prepared beforehand or from a single-stage reaction, exhibit, for example, Shore D hardnesses which can be between 20 and 75 and advantageously between 30 and 70 and an intrinsic viscosity between 0.8 and 2.5, measured in metacresol at 25° C.

Whether the polyether blocks derive from polyethylene glycol, from polypropylene glycol or from polytetramethylene glycol, they are either used as they are and copolycondensed with polyamide blocks containing carboxyl ends or they are aminated in order to be converted to polyetherdiamines and condensed with polyamide blocks containing carboxyl ends. They can also be mixed with polyamide precursors and a chain limiter in order to prepare polymers containing polyamide blocks and polyether blocks having units distributed statistically.

The polyether can be, for example, a polyethylene glycol (PEG), a polypropylene glycol (PPG) or a polytetramethylene glycol (PTMG). The latter is also known as polytetrahydrofuran (PTHF).

Whether the polyether blocks are introduced into the chain of the polymer containing polyamide blocks and polyether blocks in the form of diols or diamines, they are known for simplicity as PEG blocks or PPG blocks or alternatively PTMG blocks. It would not be departing from the scope of the invention if the polyether blocks contained different units, such as units derived from ethylene glycol, from propylene glycol or alternatively from tetramethylene glycol.

The polyamide blocks typically comprise condensation product of: one or a number of amino acids, such as aminocaproic, 7-aminoheptanoic, 11-aminoundecanoic and 12-aminododecanoic acids, or one or a number of lactams, such as caprolactam, oenantholactam and lauryllactam; one or a number of salts or mixtures of diamines, such as hexamethylenediamine,dodecamethylenediamine, meta-xylylenediamine, bis-(p-aminocyclohexyl)methane and trimethylhexamethylene-diamine, with diacids, such as isophthalic, terephthalic, adipic, azelaic, suberic, sebacic and dodecanedicarboxylic acids; or mixtures of some of these monomers, which result in copolyamides, for example polyamide-6/12 (or nylon-6/12) by condensation of caprolactam and lauryllactam. Polyamide mixtures can be used.

Preferably, the polymer having polyamide blocks and polyether blocks comprises a single type of block. Advantageously, polymers having polyamide-12 blocks and PEG blocks, and polymers having polyamide-6 blocks and PEG blocks are employed. One can however also employ blends of polymers having polyamide blocks and polyether blocks.

Polymers containing polyamide blocks and polyether blocks particularly useful for this invention are described in U.S. Pat. Nos. 4,331,786; 4,115,475; 4,195,015; 4,839,441; 4,864,0143; 4,230,838 and 4,332,920. Such polymers include products such as Pebax, available from Elf Atochem or similar materials. These types of polyether antistatic polymers have been shown to be fairly thermally stable and readily processable in the melt state in their neat form or in blends with other polymeric materials.

Thermally processable onium salts, component B, can be chosen to be any compound with an onium moiety, such as ammonium, phosphonium, arsonium, stibonium, bismuthonium, oxonium, sulfonium, selenonium, telluronium, fluronium, chloronium, bromonium, iodonium, etc., which can be thermally processed, such as meltblended, melt-compounded, melt-extruded, etc. at temperatures above 100° C., without thermal degradation or decomposition. Particularly suitable thermally processable onium salts are those used as charge control agents in toners and developers in the photocopier business, such as those disclosed in U.S. Pat. Nos. 6,027,847; 5,616,444; 5,604,069; 5,582,946; 5,561,020; 5,547,803; 5,516,616; 5,512,407; 5,508,140; 5,491,044; 5,464,719; 5,459,006; 5,198,320; and references therein and incorporated in their entirety herein below. Onium salts most suitable for this invention are those selected from the group consisting of ammonium, phosphonium, arsonium and sulfonium salts.

The weight ratio of component A: component B in the antistatic layer of the invention can vary between 99.9:0.1 and 10:90, and preferably between 99:1 and 75:25 and more preferably between 95:5 and 85:15.

In addition to components A and B, the antistatic layer of the invention may preferably comprise a binder polymer, which can provide additional desirable characteristics to the web, such as strength, stretchability, adhesion, barrier properties, low cost, etc. Such a binder polymer can be any thermoplastic polymer known in the art. Suitable classes of thermoplastic polymers preferred for this invention can include polymers of alpha-beta unsaturated monomers, polyesters, polyamides, polycarbonates, cellulosic esters, polyvinyl resins, polysulfonamides, polyethers, polyimides, polyurethanes, polyphenylenesulfides, polytetrafluoroethylene, polyacetals, polysulfonates, polyolefins, polyester ionomers, and polyolefin ionomers. Interpolymers and/or mixtures of these polymers can also be used.

Illustrative of binder polymers of alpha-beta unsaturated monomers, which are suitable for use in this invention include polymers of ethylene, propylene, hexene, butene, octene, vinylalcohol, acrylonitrile, vinylidene halide, salts of acrylic acid, salts of methacrylic acid, tetrafluoroethylene, chlorotrifluoroethylene, vinyl chloride, styrene and the like. Interpolymers and/or mixtures of these aforementioned polymers can also be used in the present invention. Most preferred polymers from this category include polypropylenes and polystyrenes together with their interpolymers and/or mixtures, because of their cost and mechanical properties.

Illustrative binder polyesters which are suitable for use in this invention can be amorphous or crystalline polyesters including those which are derived from the condensation of aromatic, cycloaliphatic, and aliphatic diols with aliphatic, aromatic and cycloaliphatic dicarboxylic acids and may be cycloaliphatic, aliphatic or aromatic polyesters. Exemplary of useful cycloaliphatic, aliphatic and aromatic polyesters which can be utilized in the practice of their invention are poly(ethylene terephthalate), poly(cyclohexlenedimethylene terephthalate) poly(ethylene dodecate), poly(butylene terephthalate), poly(ethylene naphthalate), poly(ethylene(2, 7-naphthalate)), poly(methaphenylene isophthalate), poly (glycolic acid), poly(ethylene succinate), poly(ethylene adipate), poly(ethylene sebacate), poly(decamethylene azelate), poly(ethylene sebacate), poly(decamethylene adipate), poly(decamethylene sebacate), poly (dimethylpropiolactone), poly(para-hydroxybenzoate), poly (ethylene oxybenzoate), poly(ethylene isophthalate), poly (tetramethylene terephthalate, poly(hexamethylene terephthalate), poly(decamethylene terephthalate), poly(1,4-cyclohexane dimethylene terephthalate) (trans), poly (ethylene 1,5-naphthalate), poly(ethylene 2,6-naphthalate), poly(1,4-cyclohexylene dimethylene terephthalate) (cis), and poly(1,4-cyclohexylene dimethylene terephthalate) (trans), poly(1,4 cyclohexylene dimethylene terephthalate) with different amounts of glycol and 1,4 cyclohexanedimethanol.

Polyester compounds prepared from the condensation of a diol and an aromatic dicarboxylic acid are preferred binder for use in this invention. Illustrative of such useful aromatic carboxylic acids are terephthalic acid, isophthalic acid and a o-phthalic acid, 1,3-napthalenedicarboxylic acid, 1,4 o-naphthalenedicarboxylic acid, 2,6-napthalenedicarboxylic acid, 2,7-napthalenedicarboxylic acid, 4,4'-diphenyldicarboxylic acid, 4,4'-diphenysulfphone-dicarboxylic acid, 1,1,3-trimethyl-5-carboxy-3-(p-carboxyphenyl)-idane, diphenyl ether 4,4'-dicarboxylic acid, bis-p(carboxy-phenyl)methane and the like. Of the aforementioned aromatic dicarboxylic acids, those based on a benzene ring (such as terephthalic acid, isophthalic acid, orthophthalic acid) are preferred for use in the practice of this invention. Amongst these preferred acid precursors, terephthalic acid is particularly preferred acid precursor. Also preferred are amorphous polyesters such as poly(1,4 cyclohexylene dimethylene terephthalate) with different amounts of glycol and 1,4 cyclohexanedimethanol and copolyesters prepared from the condensation of various proportions of terephthalic acid and isophthalic acid with ethylene glycol and 1,4 cyclohexane dimethanol. Examples of such polyesters are products like PETG 6763 and PCTG 5445 available from Eastman Chemical Company.

Preferred binder polyesters for use in the practice of this invention include poly(ethylene terephthalate), poly (butylene terephthalate), poly(1,4-cyclohexylene dimethylene terephthalate), poly(ethylene naphthalate), poly(1,4 cyclohexylene dimethylene terephthalate) with different amounts of glycol and 1,4 cyclohexanedimethanol as well as interpolymers and/or mixtures thereof.

Illustrative of polyamides which are suitable for use as the binder in this invention include synthetic linear polycarbonamides characterized by the presence of recurring carbonamide groups as an integral part of the polymer chain, which are separated from one another by at least two carbon atoms. Polyamides of this type include polymers, generally known in the art as nylons, obtained from diamines and dibasic acids having the recurring unit represented by the general formula:

—NHCOR$^1$COHNR$^2$— in which R$^1$ is an alkylene group of at least 2 carbon atoms, preferably from about 2 to about 11 or arylene having at least about 6 carbon atoms, preferably about 6 to about 17 carbon atoms; and R$^2$ is selected from R$^1$ and aryl groups. Also, included are copolyamides and terpolyamides obtained by known methods, for example, by condensation of hexamethylene diamine and a mixture of dibasic acids consisting of terephthalic acid and adipic acid. Polyamides of the above description are well-known in the art and include, for example, the copolyamide of 30% hexamethylene diammonium isophthalate and 70% hexamethylene diammonium adipate, poly(hexamethylene adipamide) (nylon 6,6),poly (hexamethylene sebacamide) (nylon 6, 10), poly (hexamethylene isophthalamide), poly(hexamethylene terephthalamide), poly(heptamethylene pimelamide) (nylon 7,7), poly(octamethylene suberamide) (nylon 8,8), poly (nonamethylene azelamide) (nylon 9,9) poly(decamethylene azelamide) (nylon 10,9), poly(decamethylene sebacamide) (nylon 10,10), poly(bis(4-amino cyclohexyl)methane-1,10-decane-carboxamide)), poly(m-xylylene adipamide), poly (p-xylene sebacamide), poly(2,2,2-trimethyl hexamethylene terephthalamide), poly(piperazine sebacamide), poly(p-phenylene terephthalamide), poly(metaphenylene isophthalamide) and the like.

Other useful polyamides are those formed by polymerization of amino acids and derivatives thereof, as for example lactams. Illustrative of these useful polyamides are poly(4-aminobutyric acid) (nylon 4), poly(6-aminohexanoic acid) (nylon 6), poly(7-aminoheptanoic acid) (nylon 7), poly(8-aminooctanoic acid) (nylon 8), poly(9-aminononanoic acid) (nylon 9), poly(10-amino-decanoic acid) (nylon 10), poly(11-aminoundecanoic acid) (nylon 11), poly(12-aminododecanoic acid) (nylon 12) and the like.

Most preferred binder polyamides for use in the practice of this invention include poly(caprolactam), poly(12-aminododecanoic acid), poly(hexamethylene adipamide), poly(m-xylylene adipamide), and poly(6-aminohexanoic acid) and interpolymers and/or mixtures thereof.

Illustrative of binder cellulose esters which are suitable for use in this invention include cellulose nitrate, cellulose triacetate, cellulose diacetate, cellulose acetate propionate, cellulose acetate butyrate, and interpolymers and/or mixtures thereof. Illustrative of a polycarbonate suitable for use in this invention is bisphenol-A polycarbonate. Useful polyvinyl resins include polyvinyl chloride, poly(vinyl acetal) and interpolymers and/or mixtures thereof.

Most preferred binder polymer for the invention is selected from the group consisting of polyethylene, polypropylene, poly(vinylidene halide), poly(vinyl chloride), polystyrene, amorphous or crystalline polyesters such as poly(ethylene terephthalate), poly(ethylene naphthalate) and copolyesters prepared from the condensation of various proportions of terephthalic acid and isophthalic acid with ethylene glycol and 1,4 cyclohexane dimethanol as well as various interpolymers and blends thereof. The weight ratio of component A: binder polymer in the layer of the invention can vary between 100:0 to 1:99 but preferably between 90:10 to 10:90, and most preferably between 80:20 and 20:80, to optimize electrical conductivity and mechanical strength.

Besides components A, B and the binder polymer, the present invention may include other optional components. Such optional components include nucleating agents, fillers, plasticizers, impact modifiers, chain extenders, colorants, lubricants, antistatic agents, pigments such as titanium oxide, zinc oxide, talc, calcium carbonate, barium sulfate, clay, etc., dispersants such as fatty amides, (e.g., stearamide), metallic salts of fatty acids, e.g., zinc stearate, magnesium stearate, calcium stearate, etc., dyes such as ultramarine blue, cobalt violet, etc., antioxidants, fluorescent whiteners, ultraviolet absorbers, fire retardants, matte particles or roughening agents, such as silica, titanium dioxide, talc, barium sulfate, clay, and alumina, cross linking agents, voiding agents, compatibilizers and the like. These optional components and appropriate amounts are well known in the art and can be chosen according to need.

Of these optional components, compatibilizers, pigments and particles are most preferred for their utility. Suitable compatibilizers can be any compatibilizer known in the art, which can ensure compatibility between the polyether polymeric antistat (component A) and the binder polymer. Most suitable compatibilizers are the ones which can provide a desired level of roughness to the antistatic layer, as explained in detail in co-pending application Ser. No. 10/170,117, by way of controlling phase separation and polymer domain size, so as to provide the desirable Ra of between 0.3 μm and 2.0 μm at the surface. Such conductive and desirably rough layers are particularly suitable for application in display type imaging products.

Preferred examples of such compatibilizers are: polyethylene, polypropylene, ethylene/propylene copolymers, ethylene/butene copolymers, all these products being grafted with maleic anhydride or gycidyl methacrylate; ethylene/alkyl (meth)acrylate/maleic anhydride copolymers, the maleic anhydride being grafted or copolymerized; ethylene/vinyl acetate/maleic anhydride copolymers, the maleic anhydride being grafted or copolymerized; the two above copolymers in which anhydride is replaced fully or partly by glycidyl methacrylate; ethylene/(meth)acrylic acid copolymers and optionally their salts; ethylene/alkyl (meth)acrylate/glycidyl methacrylate copolymers, the glycidyl methacrylate being grafted or copolymerized, grafted copolymers constituted by at least one mono-amino oligomer of polyamide and of an alpha-mono-olefin (co)polymer grafted with a monomer able to react with the amino functions of said oligomer; Such compatibilizers are described in, among others, EP-A-0,342,066 and EP-A-0,218,665 which are incorporated herein by reference. Most preferred compatibilizers are terpolymers of ethylene/methyl acrylate/glycidyl methacrylate and copolymers of ethylene/glycidyl methacrylate as well as polyolefins grafted with maleic anhydride, commercially available as Lotader and Orevac from Elf Atochem or similar products.

The weight concentration of the compatibilizer in the layer of the invention can vary between 0.1 to 25%, but preferably between 0.2 to 20% and most preferably between 1 to 15%, to optimize the roughness characteristics and physical properties.

Also preferred as optional components are pigments and particles, such as those selected from the group consisting of silica, titanium dioxide, talc, barium sulfate, clay, and alumina, with a preferred particle size in the range of 0.2 μm to 10 μm. Such a particle size range is chosen to optimize the desired surface effect without creating unwanted surface voids during the biaxial orientation process or embossing the front surface when the material is tightly wound in a roll.

The web of the invention can comprise a single layer or multiple layers according to need. The multiplicity of layers may include any number of auxiliary layers such as antistatic layers, backmark retention layers, tie layers or adhesion promoting layers, abrasion resistant layers, conveyance layers, barrier layers, splice providing layers, UV absorption layers, antihalation layers, optical effect providing layers, waterproofing layers, flavor and fragrance retaining layers, fragrance providing layers, adhesive layers, imaging layers and the like.

The web of the invention can be formed by any method known in the art such as those involving extrusion, coextrusion, casting, orientation, heat setting, lamination, etc. It is preferred that the web of the invention is an oriented sheet formed by any suitable method known in the art, such as by a flat sheet process or a bubble or tubular blowing process. The flat sheet process involves extruding or coextruding the materials of the sheet through a slit die and rapidly quenching the extruded or coextruded web upon a chilled casting drum so that the polymeric component(s) of the sheet are cooled rapidly below their solidification temperature without crystallizing. The quenched sheet is then biaxially oriented by stretching in mutually perpendicular directions at a temperature above the glass transition temperature of the polymer(s). The sheet may be stretched in one direction and then in a second direction or may be simultaneously stretched in both directions. The preferred range of stretch ratios in any direction is between 2:1 and 6:1. After the sheet has been stretched, it is heat set by heating to a temperature to improve the crystal structure of the polymers while restraining the sheet against retraction in both stretching directions.

The web of the invention may be subjected to any number of coatings and treatments, after extrusion, coextrusion, orientation, etc. or between casting and full orientation, to improve its properties, such as printability, barrier properties, abrasion resistance, heat-sealability, spliceability, adhesion to other supports and/or imaging layers. Examples of such coatings can be acrylic coatings for printability, polyvinylidene halide for heat seal properties, etc. Examples of such treatments can be flame, plasma and corona discharge treatment, to improve printability and adhesion. Further examples of treatments can be calendaring, embossing, patterning, etc. to obtain specific effects on the surface of the web. The web of the invention can be incorporated in any other suitable support by lamination, extrusion coating, or any other method known in the art.

A preferred application of the web of the invention is in imaging elements, including those utilizing photographic, electrophotographic, electrostatographic, photothermographic, migration, electrothermographic, dielectric recording, thermal dye transfer, ink jet and other types of imaging. A more preferred application of the web of the invention is in photographic imaging elements, particularly photographic paper and other display products.

Typical imaging supports comprise cellulose nitrate, cellulose acetate, poly(vinyl acetate), polystyrene, polyolefins, poly(ethylene terephthalate), poly(ethylene naphthalate), polycarbonate, polyamide, polyimide, glass, natural and synthetic paper, resin-coated paper, voided polymers including polymeric foam, microvoided polymers and microporous materials, fabric, etc., and the web of this invention can be incorporated in any suitable support. The improved antistatic layer of the invention can be placed anywhere in the imaging support, e.g., on the top side, or the bottom side, or both sides. However, it is preferred to be placed on the bottom side of the imaging support.

Biaxially oriented sheets commonly used in the packaging industry are commonly melt extruded and then orientated in both directions (machine direction and cross direction) to give the sheet desired mechanical strength properties. The process of biaxial orientation generally creates a surface roughness of less than 0.2 $\mu$m. While the smooth surface may have value in the packaging industry, use as a backside layer for photographic paper is limited. Laminated to the backside of the base paper, the biaxially oriented sheet must have a surface roughness greater than 0.30 $\mu$m to ensure efficient transport through the many types of photofinishing equipment that have been purchased and installed around the world. At surface roughness less that 0.30 $\mu$m, transport through the photofinishing equipment becomes less efficient. At surface roughness greater than 2.54 $\mu$m, the surface would become too rough causing transport problems in photofinishing equipment, and the rough backside surface would begin to emboss the silver halide emulsion as the material is wound in rolls. In a preferred embodiment of the invention wherein the antistatic layer comprises components A, B, a suitable binder polymer and a suitable compatibilizer, it can provide the optimum surface roughness Ra of between 0.3 $\mu$m and 2.0 $\mu$m.

The coefficient of friction (COF) for the web of the invention is less than 0.4, and preferably less than 0.3 to ensure smooth transport with minimal dusting. The surface electrical resistivity or SER of the web of this invention is substantially less than 13 log ohms/square, and preferably less than 12 log ohms/square, before and after any wet photographic processing.

In a preferred embodiment, the sheet of this invention is incorporated in imaging supports used for image display such as those comprising papers, particularly resin-coated papers, voided polymers, and combinations thereof. Particularly suited for the application of the present invention are imaging supports disclosed in U.S. Pat. Nos. 3,411,908; 3,501,298; 4,042,398; 4,188,220; 4,699,874; 4,794,071; 4,801,509; 5,244,861; 5,326,624; 5,395,689; 5,466,519; 5,780,213; 5,853,965; 5,866,282; 5,874,205; 5,888,643; 5,888,681; 5,888,683; 5,902,720; 5,935,690; 5,955,239; 5,994,045; 6,017,685; 6,017,686; 6,020,116; 6,022,677; 6,030,742; 6,030,756; 6,030,759; 6,040,036; 6,043,009; 6,045,965; 6,063,552; 6,071,654; 6,071,680; 6,074,788; 6,074,793; 6,080,532; 6,083,669; 6,093,521; and incorporated herein by reference.

In one preferred embodiment of the invention for application in photographic product, a biaxially oriented web of this invention with the skin layer on the bottom of the photographic element is formed with the following structure:
Solid core containing one or more layers
Skin layer
It is to be understood that any number of additional layers can be incorporated on either side or both sides of this web and/or in between the skin layer and the core to fulfill specific needs.

The solid core and the skin layer may be cast by co-extrusion followed by preheating, orientation, heat setting, etc., as a preferred method. The web of the invention may or may not be voided. The skin layer comprises components A, and B of the invention in appropriate amounts, and therefore is of superior antistatic characteristics. The solid core may comprise any extrudable thermoplastic polymer, such as those described for the binder polymer of the invention. It is preferred that the skin layer comprises the same thermoplastic polymer binder as the one chosen for the solid core, for better adhesion. Alternatively, if the skin and the core comprise different thermoplastic polymers, adhesion may be improved through the use of a tie layer or a suitable adhesion promoting agent. As described herein above, the web of the invention can comprise any optional addenda in any amount, any number of auxiliary layers, and can be subjected to any coatings or treatments to fulfill specific needs of the application. The thickness of the preferred biaxially oriented web can vary between 10 $\mu$m to 150 $\mu$m. Below 15 $\mu$m, the web may not be thick enough to minimize any inherent non-planarity in the support and would be more difficult to manufacture. The thickness of the skin layer relative to the total thickness of the web (i.e., core plus skin thickness) can be of any value but is preferred to be between 0.1% to 25% of the total thickness, and more preferably between 1% and 20% of the total thickness.

In this preferred embodiment, the web of the invention is incorporated on to the backside of a photographic support, which could comprise, polymers, paper, synthetic paper, voided polymers including microvoided polyethylene terephthalate such as those disclosed in U.S. Pat. Nos. 4,912,333; 4,994,312; and 5,055,371; microvoided polyolefins such as those disclosed in U.S. Pat. Nos. 5,244,861; 5,352,653; 5,853,965, 5,866,282; 5,874,205; 5,888,643; 5,902,720; 5,994,045; and 6,071,654; and microporous materials such as those disclosed in U.S. Pat. Nos. 4,833,172; 4,861,644; 4,877,679; 4,892,779; 4,972,802;, 4,937,115;, 4,957,787; 4,959,208; 5,032,450; 5,035,886; 5,047,283; 5,071,645; 5,114,438; 5,196,262; 5,326,391 and 5,583,171; cloth, woven polymer fibers, or combinations thereof. In the most preferred embodiment for photographic display, the web of the invention is adhered to the backside of photographic paper base comprising natural cellulosic paper fibers.

The front side of the imaging support can comprise any polymer based film, which may further comprise voided polymers including microvoided polymers and microporous materials, such as referenced herein before. Particularly suitable front side films, preferred methods of their formation and application to imaging supports such as photographic display products are disclosed in U.S. Pat. Nos. 5,853,965, 5,866,282; 5,874,205; 5,888,643; 5,902,720; 5,994,045; etc. and references therein.

When using a cellulose fiber paper support, it is preferable to extrusion laminate the web of the invention to the base paper using a polyolefin resin. Extrusion laminating is carried out by bringing together the biaxially oriented web of the invention and the base paper with application of an adhesive between them followed by their being pressed in a nip such as between two rollers. The adhesive may be applied to either the biaxially oriented web or the base paper prior to their being brought into the nip. In a preferred form the adhesive is applied into the nip simultaneously with the biaxially oriented web and the base paper. The adhesive may be any suitable material that does not have a harmful effect upon the photographic element. A preferred material is polyethylene that is melted at the time it is placed into the nip between the paper and the biaxially oriented sheet.

During the lamination process, it is desirable to maintain control of the tension of the biaxially oriented web in order to minimize curl in the resulting laminated support. For high humidity applications (>50% RH) and low humidity applications (<20% RH), it is desirable to laminate both a front side and backside film to keep curl to a minimum In one preferred embodiment, in order to produce photographic elements with a desirable photographic look and feel, it is preferable to use relatively thick paper supports, e.g., at least 120 $\mu$m thick, preferably from 120 $\mu$m to 250 $\mu$m thick, and relatively thin front side films comprising microvoided composite sheets e.g., less than 50 $\mu$m thick, preferably from 20 $\mu$m to 50 $\mu$m thick, more preferably from 30 $\mu$m to 50 $\mu$m thick.

The preferred photographic element is a material that utilizes photosensitive silver halide in the formation of images. In the case of thermal dye transfer or ink jet, the image layer that is coated on the imaging element may be any material that is known in the art such as such as gelatin, pigmented latex, polyvinyl alcohol, polycarbonate, polyvinyl pyrrolidone, starch, and methacrylate. The photographic elements can be single color elements or multicolor elements. Multicolor elements contain image dye-forming units sensitive to each of the three primary regions of the spectrum. Each unit can comprise a single emulsion layer or multiple emulsion layers sensitive to a given region of the spectrum. The layers of the element, including the layers of the image-forming units, can be arranged in various orders as known in the art. In an alternative format, the emulsions sensitive to each of the three primary regions of the spectrum can be disposed as a single segmented layer.

The photographic emulsions useful for this invention are generally prepared by precipitating silver halide crystals in a colloidal matrix by methods conventional in the art. The colloid is typically a hydrophilic film forming agent such as gelatin, alginic acid, or derivatives thereof.

The crystals formed in the precipitation step are washed and then chemically and spectrally sensitized by adding spectral sensitizing dyes and chemical sensitizers, and by providing a heating step during which the emulsion temperature is raised, typically from 40.degree. C. to 70.degree. C., and maintained for a period of time. The precipitation and spectral and chemical sensitization methods utilized in preparing the emulsions employed in the invention can be those methods known in the art.

Chemical sensitization of the emulsion typically employs sensitizers such as: sulfur-containing compounds, e.g., allyl isothiocyanate, sodium thiosulfate and allyl thiourea; reducing agents, e.g., polyamines and stannous salts; noble metal compounds, e.g., gold, platinum; and polymeric agents, e.g., polyalkylene oxides. As described, heat treatment is employed to complete chemical sensitization. Spectral sensitization is effected with a combination of dyes, which are designed for the wavelength range of interest within the visible or infrared spectrum. It is known to add such dyes both before and after heat treatment.

After spectral sensitization, the emulsion is coated on a support. Various coating techniques include dip coating, air knife coating, curtain coating and extrusion coating.

The silver halide emulsions utilized in this invention may be comprised of any halide distribution. Thus, they may be comprised of silver chloride, silver chloroiodide, silver bromide, silver bromochloride, silver chlorobromide, silver iodochloride, silver iodobromide, silver bromoiodochloride, silver chloroiodobromide, silver iodobromochloride, and silver iodochlorobromide emulsions. It is preferred, however, that the emulsions be predominantly silver chloride emulsions. By predominantly silver chloride, it is meant that the grains of the emulsion are greater than about 50 mole percent silver chloride. Preferably, they are greater than about 90 mole percent silver chloride; and optimally greater than about 95 mole percent silver chloride.

The silver halide emulsions can contain grains of any size and morphology. Thus, the grains may take the form of cubes, octahedrons, cubo-octahedrons, or any of the other naturally occurring morphologies of cubic lattice type silver halide grains. Further, the grains may be irregular such as spherical grains or tabular grains. Grains having a tabular or cubic morphology are preferred.

The photographic elements of the invention may utilize emulsions as described in The Theory of the Photographic Process, Fourth Edition, T. H. James, Macmillan Publishing Company, Inc., 1977, pages 151–152. Reduction sensitization has been known to improve the photographic sensitivity of silver halide emulsions. While reduction sensitized silver halide emulsions generally exhibit good photographic speed, they often suffer from undesirable fog and poor storage stability.

Reduction sensitization can be performed intentionally by adding reduction sensitizers, chemicals which reduce silver ions to form metallic silver atoms, or by providing a reducing environment such as high pH (excess hydroxide ion) and/or low pAg (excess silver ion). During precipitation of a silver halide emulsion, unintentional reduction sensitization can occur when, for example, silver nitrate or alkali solutions are added rapidly or with poor mixing to form emulsion grains. Also, precipitation of silver halide emulsions in the presence of ripeners (grain growth modifiers) such as thioethers, selenoethers, thioureas, orammonia tends to facilitate reduction sensitization.

Examples of reduction sensitizers and environments which may be used during precipitation or spectral/chemical sensitization to reduction sensitize an emulsion include ascorbic acid derivatives; tin compounds; polyamine compounds; and thiourea dioxide-based compounds described in U.S. Pat. Nos. 2,487,850; 2,512,925; and British Patent 789,823. Specific examples of reduction sensitizers or conditions, such as dimethylamineborane, stannous chloride, hydrazine, high pH (pH 8–11) and low pAg (pAg 1–7) ripening are discussed by S. Collier in Photographic Science and Engineering, 23,113 (1979). Examples of processes for preparing intentionally reduction sensitized silver halide emulsions are described in EP 0 348934 A1 (Yamashita), EP 0 369491 (Yamashita), EP 0 371388 (Ohashi), EP 0 396424 A1 (Takada), EP 0 404142 A1 (Yamada), and EP 0 435355 A1 (Makino).

The photographic elements of this invention may use emulsions doped with Group VIII metals such as iridium, rhodium, osmium, and iron as described in Research Disclosure, September 1996, Item 38957, Section I, published by Kenneth Mason Publications, Ltd., Dudley Annex, 12a North Street, Emsworth, Hampshire PO10 7DQ, ENGLAND. Additionally, a general summary of the use of iridium in the sensitization of silver halide emulsions is contained in Carroll, "Iridium Sensitization: A Literature Review," Photographic Science and Engineering, Vol. 24, No. 6, 1980. A method of manufacturing a silver halide emulsion by chemically sensitizing the emulsion in the presence of an iridium salt and a photographic spectral sensitizing dye is described in U.S. Pat. No. 4,693,965. In some cases, when such dopants are incorporated, emulsions show an increased fresh fog and a lower contrast sensitometric curve when processed in the color reversal E-6 process as described in The British Journal of Photography Annual, 1982, pages 201–203.

A typical multicolor photographic element of the invention comprises the invention laminated support bearing a cyan dye image-forming unit comprising at least one red-sensitive silver halide emulsion layer having associated therewith at least one cyan dye-forming coupler, a magenta image-forming unit comprising at least one green-sensitive silver halide emulsion layer having associated therewith at least one magenta dye-forming coupler; and a yellow dye image-forming unit comprising at least one blue-sensitive silver halide emulsion layer having associated therewith at least one yellow dye-forming coupler. The element may contain additional layers, such as filter layers, interlayers, overcoat layers, subbing layers, and the like. The support of the invention may also be utilized for black and white photographic print elements.

The photographic elements may also contain a transparent magnetic recording layer such as a layer containing magnetic particles on the underside of a transparent support, as in U.S. Pat. Nos. 4,279,945 and 4,302,523. Typically, the element will have a total thickness (excluding the support) of from about 5 to about 30 µm.

In the following table, reference will be made to (1) Research Disclosure, December 1978, Item 17643, (2) Research Disclosure, December 1989, Item 308119, and (3) Research Disclosure, September 1996, Item 38957, all published by Kenneth Mason Publications, Ltd., Dudley Annex, 12a North Street, Emsworth, Hampshire PO10 7DQ, ENGLAND. The table and the references cited in the table are to be read as describing particular components suitable for use in the elements of the invention. The table and its cited references also describe suitable ways of preparing, exposing, processing and manipulating the elements, and the images contained therein.

| Reference | Section | Subject Matter |
|---|---|---|
| 1 | I, II | Grain composition, |
| 2 | I, II, IX, X, XI, XII, XIV, XV I, II, III, IX | morphology and preparation. Emulsion preparation including hardeners, coating aids, addenda, etc. |
| 3 | A & B | |
| 1 | III, IV | Chemical sensitization and |
| 2 | III, IV | spectral sensitization/ |
| 3 | IV, V | desensitization |
| 1 | V | UV dyes, optical brighteners, |
| 2 | V | luminescent dyes |
| 3 | VI | |
| 1 | VI | Antifoggants and stabilizers |
| 2 | VI | |
| 3 | VII | |
| 1 | VIII | Absorbing and scattering |
| 2 | VIII, XIII, XVI | materials; Antistatic layers, matting agents |
| 3 | VIII, IX C & D | |
| 1 | VII | Image-couplers and image- |
| 2 | VII | modifying couplers; Dye |
| 3 | X | stabilizers and hue modifiers |
| 1 | XVII | Supports |
| 2 | XVII | |
| 3 | XV | |
| 3 | XI | Specific layer arrangements |
| 3 | XII, XIII | Negative working emulsions; Direct positive emulsions |
| 2 | XVIII | Exposure |
| 3 | XVI | |
| 1 | XIX, XX | Chemical processing; |
| 2 | XIX, XX, XXII | Developing agents |
| 3 | XVIII, XIX, XX | |
| 3 | XIV | Scanning and digital processing procedures |

The photographic elements can be exposed with various forms of energy which encompass the ultraviolet, visible, and infrared regions of the electromagnetic spectrum as well as with electron beam, beta radiation, gamma radiation, x-ray, alpha particle, neutron radiation, and other forms of corpuscular and wave-like radiant energy in either noncoherent (random phase) forms or coherent (in phase) forms, as produced by lasers. When the photographic elements are intended to be exposed by x-rays, they can include features found in conventional radiographic elements.

The photographic elements are preferably exposed to actinic radiation, typically in the visible region of the spectrum, to form a latent image, and then processed to form a visible image, preferably by other than heat treatment. Processing is preferably carried out in the known RA-4.TM. (Eastman Kodak Company) Process or other processing systems suitable for developing high chloride emulsions.

The laminated substrate of the invention may have copy restriction features incorporated such as disclosed in U.S. patent application Ser. No. 08/598,785 filed Feb. 8, 1996 and application Ser. No. 08/598,778 filed on the same day. These applications disclose rendering a document copy restrictive by embedding into the document a pattern of invisible microdots. These microdots are, however, detectable by the electro-optical scanning device of a digital document copier. The pattern of microdots may be incorporated throughout the document. Such documents may also have colored edges or an invisible microdot pattern on the backside to enable users or machines to read and identify the media. The media may take the form of sheets that are capable of bearing an image. Typical of such materials are photographic paper and film materials composed of polyolefin resin coated paper, polyester, (poly)ethylene naphthalate, and cellulose triacetate based materials.

The microdots can take any regular or irregular shape with a size smaller than the maximum size at which individual microdots are perceived sufficiently to decrease the usefulness of the image, and the minimum level is defined by the detection level of the scanning device. The microdots may be distributed in a regular or irregular array with center-to-center spacing controlled to avoid increases in document density. The microdots can be of any hue, brightness, and saturation that does not lead to sufficient detection by casual observation, but preferably of a hue least resolvable by the human eye, yet suitable to conform to the sensitivities of the document scanning device for optimal detection.

In one embodiment the information-bearing document is comprised of a support, an image-forming layer coated on the support and pattern of microdots positioned between the support and the image-forming layer to provide a copy restrictive medium. Incorporation of the microdot pattern into the document medium can be achieved by various printing technologies either before or after production of the original document. The microdots can be composed of any colored substance, although depending on the nature of the document, the colorants may be translucent, transparent, or opaque. It is preferred to locate the microdot pattern on the support layer prior to application of the protective layer, unless the protective layer contains light scattering pigments. Then the microdots should be located above such layers and preferably coated with a protective layer. The microdots can be composed of colorants chosen from image dyes and filter dyes known in the photographic art and dispersed in a binder or carrier used for printing inks or light-sensitive media.

In a preferred embodiment the creation of the microdot pattern as a latent image is possible through appropriate temporal, spatial and spectral exposure of the photosensitive materials to visible or non-visible wavelengths of electromagnetic radiation. The latent image microdot pattern can be rendered detectable by employing standard photographic chemical processing. The microdots are particularly useful for both color and black-and-white image-forming photographic media. Such photographic media will contain at least one silver halide radiation sensitive layer, although typically such photographic media contain at least three silver halide radiation sensitive layers. It is also possible that such media contain more than one layer sensitive to the same region of radiation. The arrangement of the layers may take any of the forms known to one skilled in the art, as discussed in Research Disclosure 37038 of February 1995.

The following examples illustrate the practice of this invention. They are not intended to be exhaustive of all possible variations of the invention. Parts and percentages are by weight unless otherwise indicated.

EXAMPLES

Examples of biaxially oriented webs of this invention are prepared with a skin layer comprising components A and B, on a solid core of polyester (PET) or polypropylene (PP) as schematically shown below:

Solid core of polyester or polypropylene
Skin layer comprising components A and B
Component A in the skin layer is chosen to be a polyether-block-copolyamide, Pebax MV 1074 or Pebax MV 1657, supplied by Elf Atochem. Pebax MV 1074 is a polyamide-12 based polymer with a PEG ether segment and Pebax MH 1657 is a polyamide-6 based polymer with a PEG ether segment. Component B in the skin layer is chosen to be either an ammonium salt, namely benzyldimethyloctadecylammonium 3-nitrobenzenesulfonate or a phosphonium salt, namely methylphenylphosphonium p-methylbenzenesulfonate salt.

In some samples the skin layer also comprises an extrudable binder polymer such as a low density polyethylene, Tenite PE D4002-P or an amorphous copolyester PETG 6763, both products supplied by Eastman Chemical Company or a homopolymer of polypropylene P4G2Z-073A, supplied by Huntsman. In some examples the skin layer further comprises a compatibilizer, which is a terpolymer of ethylene/methyl acrylate/glycidyl methacylate, supplied by Elf Atochem as Lotader 8900. The aforementioned binder polymers, namely polyethylene, amorphous copolyester and polypropylene are henceforth referred to as PE, PETG and PP respectively. It is to be noted that the PP used as a binder polymer in the skin is the same commercial grade PP as that used in the core.

The material of the skin layer, with different ratios of various components, is pre-compounded and pelletized in a co-rotating twin screw compounder. The pellets of the precompounded material for the skin and the material for the core, are dried at 65° C. and fed by two plasticating screw extruders into a co-extrusion die manifold to produce a two-layered melt stream, which is rapidly quenched on a chill roll after issuing from the die. By regulating the throughputs of the extruders it is possible to adjust the thickness ratio of the skin layer and the core in the cast sheet. In these cast sheets, the core layer thickness is nominally maintained at 750 $\mu$m. The cast sheets with a PP core thus formed is stretched in the machine direction by 5× and in the transverse direction in a tenter frame by 5×, at a temperature of 150° C. to form a sample sheet, wherein the core thickness is approximately 30 $\mu$m. The cast sheets with PET core are similarly produced but stretching is performed by first drafting the sheet at 3.3× in the machine direction followed by tentering at 3.3× in the transverse direction, at a temperature of 100° C. in both stretches.

For resistivity tests, samples are preconditioned at 50% RH (unless otherwise noted) and at 72° F. for at least 24 hours prior to testing. Surface electrical resistivity (SER) of the skin layer is measured with a Keithly Model 616 digital electrometer using a two point DC probe by a method similar to that described in U.S. Pat. No. 2,801,191. SER can be measured before and after the sample has been run though a typical wet chemical processing, such as C-41 processing. For desirable performance, the antistatic skin layer should exhibit SER values <13 log ohms/square.

For backmark retention (BMR) tests, a printed image is applied onto the skin layer of the ample using a dot matrix printer. The sample is then subjected to a conventional developer for 30 seconds, washed with warm water for 5 seconds and rubbed for print retention evaluation. The following ratings are assigned, 1=Outstanding, very little difference between processed and unprocessed appearance.
    2=Excellent, slight degradation of appearance
    3=Acceptable, medium degradation of appearance
    4=Unacceptable, serious degradation of appearance 5=Unacceptable, total degradation.

For desirable performance, the BMR rating should be <4.

For roughness or Ra values a Gould Microtopographer stylus instrument is used, utilizing a diamond stylus with a light load of 50 mg to avoid surface damage. The roughness average Ra of the skin layer is determined, as per ASME B46.1-1995. The roughness average, Ra is the arithmetic average of the absolute values of the profile height deviations recorded within the evaluation length and measured from the mean line. Ra values are expressed in μm.

For writability, an ordinary pencil is used to write indicia on the skin layer of the sample. Dark, clearly legible indicia indicate "good" writability of the sample.

The following materials A1–A8, as described in Table 1, are compounded with Pebax 1074 as component A, and the ammonium salt (Materials A2–A5) or the phosphonium salt (Materials A6–A8) as component B in different ratios, in a manner described herein above. The compounded materials are pressed in a carver press to discs of suitable size. The SER of these discs is measured to evaluate the effectiveness of component B in improving the conductivity of component A. As shown in Tables 1, this is indeed the case. Addition of just 1% of component B, both as an ammonium salt and as a phosphonium salt, lowers the SER of component A by more than two orders of magnitude.

TABLE 1

| Material | Component A Pebax 1074 Weight % | Component B Ammonium salt Weight % | SER log ohms/square |
|---|---|---|---|
| Material A1 | 100% | 0% | 10.2 |
| Material A2 | 99% | 1% | 8 |
| Material A3 | 97% | 3% | 7.4 |
| Material A4 | 90% | 10% | 7.3 |
| Material A5 | 85% | 15% | 7.3 |

| Material | Component A Pebax 1074 Weight % | Component B Phosphonium salt Weight % | SER log ohms/square |
|---|---|---|---|
| Material A6 | 99% | 1% | 7.6 |
| Material A7 | 95% | 5% | 7.6 |
| Material A8 | 90% | 10% | 7.4 |

The following biaxially oriented sheets, Examples 1–12 are prepared as per the invention with details listed in Table 2a whereas comparative samples Comp. 1–5 are formed by the same process as the invention but with materials devoid of component B, namely the onium salts of the invention, with details listed in Table 2b. The physical performance data of Ex. 1–12 are listed in Table 3a whereas those of Comp. 1–5 are listed in Table 3b.

TABLE 2a

| | Skin layer composition | | | Core layer | Skin | Core |
|---|---|---|---|---|---|---|
| Sample | Component A Weight % | Component B Weight % | Addenda Weight % | composition Weight % | thickness μm | thickness μm |
| Ex. 1 | Pebax 1074 95% | Ammonium salt 5% | none | PET 100% | 14 | 75 |
| Ex. 2 | Pebax 1074 95% | Ammonium salt 5% | none | PET 100% | 10 | 75 |
| Ex. 3 | Pebax 1074 95% | Ammonium salt 5% | none | PET 100% | 2 | 75 |
| Ex. 4 | Pebax 1074 47.5% | Ammonium salt 2.5% | PETG 50% | PET 100% | 14 | 75 |
| Ex. 5 | Pebax 1074 47.5% | Ammonium salt 2.5% | PETG 50% | PET 100% | 10 | 75 |
| Ex. 6 | Pebax 1074 47.5% | Ammonium salt 2.5% | PETG 50% | PET 100% | 2 | 75 |
| Ex. 7 | Pebax 1074 47.5% | Ammonium salt 2.5% | PE 50% | PP 100% | 5.8 | 30 |
| Ex. 8 | Pebax 1074 47.5% | Ammonium salt 2.5% | PE 50% | PP 100% | 4 | 30 |
| Ex. 9 | Pebax 1657 95% | Ammonium salt 5% | none | PET 100% | 2 | 75 |
| Ex. 10 | Pebax 1657 47.5% | Ammonium salt 2.5% | PETG 50% | PET 100% | 10 | 75 |
| Ex. 11 | Pebax 1657 47.5% | Ammonium salt 2.5% | PETG 50% | PET 100% | 2 | 75 |
| Ex. 12 | Pebax 1657 47.5% | Ammonium salt 2.5% | PE 50% | PP 100% | 4 | 30 |

TABLE 2b

| | Skin layer composition | | | Core layer | Skin | Core |
|---|---|---|---|---|---|---|
| Sample | Component A Weight % | Component B Weight % | Addenda Weight % | composition Weight % | thickness μm | thickness μm |
| Comp. 1 | Pebax 1074 100% | none | none | PET 100% | 10 | 75 |

TABLE 2b-continued

| Sample | Skin layer composition Component A Weight % | Component B Weight % | Addenda Weight % | Core layer composition Weight % | Skin thickness μm | Core thickness μm |
|---|---|---|---|---|---|---|
| Comp. 2 | Pebax 1074 50% | none | PETG 50% | PET 100% | 10 | 75 |
| Comp. 3 | Pebax 1074 50% | none | PE 50% | PP 100% | 4 | 30 |
| Comp. 4 | Pebax 1657 50% | none | PETG 50% | PET 100% | 2 | 75 |
| Comp. 5 | Pebax 1657 50% | none | PE 50% | PP 100% | 4 | 30 |

TABLE 3a

| Sample | Pre-processing SER log ohms/square | Post-processing SER log ohms/square | BMR |
|---|---|---|---|
| Ex. 1 | 9.4 | | |
| Ex. 2 | 9.3 | 10.6 | |
| Ex. 3 | 10 | 10.9 | |
| Ex. 4 | 9.9 | | |
| Ex. 5 | 9.9 | 10.4 | |
| Ex. 6 | 10.6 | | |
| Ex. 7 | 10.9 | 10.8 | 2 |
| Ex. 8 | 10.4 | | 2 |
| Ex. 9 | 9.9 | | |
| Ex. 10 | 9.9 | 10.4 | |
| Ex. 11 | 10.9 | 10.9 | |
| Ex. 12 | 10 | 10.5 | 2 |

TABLE 3b

| Sample | Pre-processing SER log ohms/square |
|---|---|
| Comp. 1 | 11.4 |
| Comp. 2 | 11.5 |
| Comp. 3 | 12 |
| Comp. 4 | 11.6 |
| Comp. 5 | 12.6 |

It is clear that samples Ex. 1–12 prepared as per invention have superior conductivity as reflected in SER values substantially lower than 12 log ohms/square. In fact, samples prepared as per invention can attain SER values lower than 11 log ohms/square rendering them very suitable for effective static dissipation in demanding situations. It is also clear that when subjected to a wet chemical processing, such as C-41 processing, the examples of the invention can retain conductivity as reflected in their post-processing SER values of less than 12 log ohms/square and even less than 11 log ohms/square. This characteristic demonstrates the capability of the invention in minimizing post-processing dirt attraction, print sticking, etc. encountered in common imaging elements. It is further clear that the examples of the invention possess desirable backmark retention characteristics as reflected in their BMR of <4 rendering them attractive for application in display type imaging elements.

The superiority of the examples of the invention can be further realized through comparison with the comparative samples. One can compare and contrast Comp. 1 with Ex. 2; Comp. 2 with Ex. 5; Comp. 3 with Ex. 8; Comp. 4 with Ex. 11 and Comp. 5 with Ex. 12. In each of these cases, the only difference between the comparative sample and the example is that the comparative sample does not contain any onium salt. It is very clear that in each of these cases the presence of the onium salt, component B of the invention, imparts lower SER value to the examples of the invention. The difference in SER between the examples of the invention and their comparative counterparts can be as high as 2 log ohms/square or 2 orders of magnitude, demonstrating the superiority of the invention.

The sample Comp. 6 is a biaxially oriented sheet comprising Pebax 1074, a PP binder polymer and a compatibilizer Lotader 8900 in the skin layer with a PP core to obtain a suitably rough surface for conveyance, writability, etc. The sample Ex. 13 is prepared similar to Comp. 6 but with phosphonium salt additionally incorporated in the skin layer as per the present invention. The details about the composition of these two samples are listed in Table 4a, and their corresponding test results are listed in Table 4b.

TABLE 4a

| Sample | Skin layer composition Component A Weight % | Component B Weight % | Addenda Weight % | Core layer composition Weight % | Skin thickness μm | Core thickness μm |
|---|---|---|---|---|---|---|
| Comp. 6 | Pebax 1074 50% | None | PP binder 40% Lotader 8900 10% | PP 100% | 4 | 30 |
| Ex. 13 | Pebax 1074 47.5% | Phosphonium salt 2.5% | PP binder 40% Lotader 8900 10% | PP 100% | 4 | 30 |

TABLE 4b

| Sample | Pre-processing SER log ohms/square | Roughness Ra, μm | Writability | BMR |
|---|---|---|---|---|
| Comp. 6 | 11.4 | 1.42 | good | 2 |
| Ex. 13 | 10.9 | 0.68 | good | 1 |

It is clear that Ex. 13 prepared in accordance with the present invention provides superior SER value compared to sample Comp. 6, which is devoid of any onium salt (component B of invention). It is also clear that Ex. 13 provides desirable roughness of Ra between 0.3 μm and 2 μm, good writability and desirable backmark retention characteristics with BMR<4. This demonstrates that Ex. 13 is at par with sample Comp.6 in terms of roughness, writability and backmark retention but is superior to Comp.6 in terms of antistatic characteristics because of the presence of the onium salt.

The invention has been described in detail with particular reference to certain preferred embodiments thereof, but it will be understood that variations and modifications can be effected within the spirit and scope of the invention.

What is claimed is:

1. A material comprising a sheet wherein said sheet comprises at least one layer comprising polyether polymeric antistat and thermally processable onium salt, wherein said onium salt comprises methylphenylphosphonium p-methylbenzenesulfonate salt.

2. The material of claim 1 further comprising polyolefin binder polymer.

3. The material of claim 1 further comprising polyester binder polymer.

4. The material of claim 1 wherein said at least one layer comprises said polyether polymeric antistat and said thermally processable onium salt in a weight ratio between 99.9:0.1 and 10:90.

5. The material of claim 1 wherein said sheet comprises an oriented polymer sheet.

6. The material of claim 1 further comprising polypropylene binder polymer.

7. The material of claim 1 wherein said at least one layer comprises said polyether polymeric antistat and a binder polymer in a weight ratio between 100:0 and 1:99.

8. An imaging element comprising an image layer and a thermally processable substrate wherein said substrate comprises at least one layer comprising thermally processable polyether polymeric antistat and thermally processable onium salt, wherein said at least one layer further comprises polyolefin, polyester, or polypropylene binder polymer.

9. The imaging element of claim 8 wherein said at least one layer comprises said polyether polymeric antistat and said thermally processable onium salt in a weight ratio between 99.9:0.1 and 10:90.

10. The imaging element of claim 8 wherein said at least one layer comprises said polyether polymeric antistat and a binder polymer in a weight ratio between 100:0 and 1:99.

11. The imaging element of claim 8 wherein said substrate comprises an oriented polymer sheet.

12. The imaging element of claim 8 wherein said onium salt is selected from the group consisting of at least one of ammonium, phosphonium, and sulfonium salts.

13. The imaging element of claim 8 wherein said onium salt comprises benzyldimethyloctadecylammonium 3-nitrobenzenesulfonate.

14. The imaging element of claim 8 wherein said onium salt comprises methylphenylphosphonium p-methylbenzenesulfonate salt.

15. The imaging element of claim 8 wherein said image layer comprises at least one photosensitive silver halide layer.

16. The imaging element of claim 8 wherein said image layer comprises an ink jet receiving layer.

17. The imaging element of claim 8 wherein said image layer comprises a thermal dye receiving layer.

18. The imaging element of claim 8 wherein said substrate comprises a paper core having an oriented sheet laminated to the top and bottom side.

19. The imaging element of claim 18 wherein said at least one layer comprising antistat and onium salt is located on the bottom surface of said substrate.

20. The imaging element of claim 18 wherein said at least one layer comprising antistat and onium salt is located on the top surface of said substrate.

21. The imaging element of claim 18 wherein said substrate comprises paper with a polyethylene layer on each side and said at least one layer comprising antistat and onium salt is located on the bottom surface of said substrate.

22. The imaging element of claim 8 wherein said at least one layer further comprises hydrophobic binder polymer.

23. The imaging element of claim 8 wherein said substrate comprises cellulose acetate film base.

24. The imaging element of claim 12 wherein said onium salt comprises an ammonium salt and said ammonium salt comprises benzyldimethyl-octadecylammonium 3-nitrobenzenesulfonate salt.

25. The material of claim 12 wherein said onium salt comprises a phosphonium salt and said phosphonium salt comprises methylphenyl-phosphonium p-methylbenzenesulfonate salt.

26. A material comprising a sheet wherein said sheet comprises at least one layer comprising polyether polymeric antistat and thermally processable benzyldimethyloctadecylammonium 3-nitrobenzenesulfonate onium salt.

27. The material of claim 26 further comprising polyolefin binder polymer.

28. The material of claim 26 further comprising polyester binder polymer.

29. The material of claim 26 wherein said at least one layer comprises said polyether polymeric antistat and said thermally processable methylphenylphosphonium p-methylbenzenesulfonate onium salt in a weight ratio between 99.9:0.1 and 10:90.

30. The material of claim 26 wherein said sheet comprises an oriented polymer sheet.

31. The material of claim 26 further comprising polypropylene binder polymer.

32. The material of claim 26 wherein said at least one layer comprises said polyether polymeric antistat and a binder polymer in a weight ratio between 100:0 and 1:99.

33. An imaging element comprising an image layer and a substrate wherein said substrate comprises at least one layer comprising polyester binder polymer, polyether polymeric antistat, and thermally processable onium salt.

34. The imaging element of claim 33 wherein said at least one layer comprises said polyether polymeric antistat and said thermally processable onium salt in a weight ratio between 99.9:0.1 and 10:90.

35. The imaging element of claim 33 wherein said substrate comprises an oriented polymer sheet.

36. The imaging element of claim 33 wherein said onium salt is selected from the group consisting of at least one of ammonium, phosphonium, and sulfonium salts.

37. The imaging element of claim 33 wherein said onium salt comprises benzyldimethyloctadecylammonium 3-nitrobenzenesulfonate.

38. The imaging element of claim 33 wherein said onium salt comprises methylphenylphosphonium p-methylbenzenesulfonate salt.

39. The imaging element of claim 33 wherein said image layer comprises at least one photosensitive silver halide layer.

40. The imaging element of claim 33 wherein said image layer comprises an ink jet receiving layer.

41. The imaging element of claim 33 wherein said image layer comprises a thermal dye receiving layer.

42. The imaging element of claim 33 wherein said substrate comprises a paper core having an oriented sheet laminated to the top and bottom side.

43. The imaging element of claim 42 wherein said at least one layer comprising polyester binder polymer, antistat and onium salt is located on the bottom surface of said substrate.

44. The imaging element of claim 42 wherein said at least one layer comprising polyester binder polymer, antistat and onium salt is located on the top surface of said substrate.

45. The imaging element of claim 42 wherein said substrate comprises paper with a polyethylene layer on each side and said at least one layer comprising polyester binder polymer, antistat and onium salt is located on the bottom surface of said substrate.

46. The imaging element of claim 42 wherein said at least one layer further comprises hydrophobic binder polymer.

47. An imaging element comprising an image layer and a substrate wherein said substrate comprises at least one layer comprising polyether polymeric antistat, thermally processable onium salt, and polyolefin binder polymer.

48. The imaging element of claim 47 wherein said at least one layer comprises said polyether polymeric antistat and said thermally processable onium salt in a weight ratio between 99.9:0.1 and 10:90.

49. The imaging element of claim 47 wherein said substrate comprises an oriented polymer sheet.

50. The imaging element of claim 47 wherein said a least one layer further comprises polypropylene binder polymer.

51. The imaging element of claim 47 wherein said onium salt is selected from the group consisting of at least one of ammonium, phosphonium, and sulfonium salts.

52. The imaging element of claim 47 wherein said onium salt comprises benzyldimethyloctadecylammonium 3-nitrobenzenesulfonate.

53. The imaging element of claim 47 wherein said onium salt comprises methylphenylphosphonium p-methylbenzenesulfonate salt.

54. The imaging element of claim 47 wherein said image layer comprises at least one photosensitive silver halide layer.

55. The imaging element of claim 47 wherein said image layer comprises an ink jet receiving layer.

56. The imaging element of claim 47 wherein said image layer comprises a thermal dye receiving layer.

57. The imaging element of claim 47 wherein said substrate comprises a paper core having an oriented sheet laminated to the top and bottom side.

58. The imaging element of claim 57 wherein said at least one layer comprising antistat and onium salt is located on the bottom surface of said substrate.

59. The imaging element of claim 57 wherein said at least one layer comprising antistat and onium salt is located on the top surface of said substrate.

60. The imaging element of claim 57 wherein said substrate comprises paper with a polyethylene layer on each side and said at least one layer comprising antistat and onium salt is located on the bottom surface of said substrate.

61. The imaging element of claim 57 wherein said a least one layer further comprises hydrophobic binder polymer.

62. An imaging element comprising an image layer and a thermally processable substrate wherein said substrate comprises at least one layer comprising thermally processable polyether polymeric antistat and thermally processable onium salt, wherein said substrate comprises a paper core having an oriented sheet laminated to the top and bottom side, and wherein said at least one layer further comprises hydrophobic binder polymer.

63. The imaging element of claim 62 wherein said at least one layer further comprises polyolefin, polyester, or polypropylene binder polymer.

64. The imaging element of claim 62 wherein said at least one layer comprises said polyether polymeric antistat and said thermally processable onium salt in a weight ratio between 99.9:0.1 and 10:90.

65. The imaging element of claim 62 wherein said at least one layer comprises said polyether polymeric antistat and a binder polymer in a weight ratio between 100:0 and 1:99.

66. The imaging element of claim 62 wherein said onium salt is selected from the group consisting of at least one of ammonium, phosphonium, and sulfonium salts.

67. The imaging element of claim 62 wherein said onium salt comprises benzyldimethyloctadecylammonium 3-nitrobenzenesulfonate.

68. The imaging element of claim 62 wherein said onium salt comprises methylphenylphosphonium p-methylbenzenesulfonate salt.

69. The imaging element of claim 62 wherein said image layer comprises at least one photosensitive silver halide layer.

70. The imaging element of claim 62 wherein said image layer comprises an ink jet receiving layer.

71. The imaging element of claim 62 wherein said image layer comprises a thermal dye receiving layer.

72. The imaging element of claim 62 wherein said at least one layer comprising antistat and onium salt is located on the bottom surface of said substrate.

73. The imaging element of claim 62 wherein said at least one layer comprising antistat and onium salt is located on the top surface of said substrate.

74. The imaging element of claim 62 wherein said substrate comprises paper with a polyethylene layer on each side and said at least one layer comprising antistat and onium salt is located on the bottom surface of said substrate.

* * * * *